Figure 2:
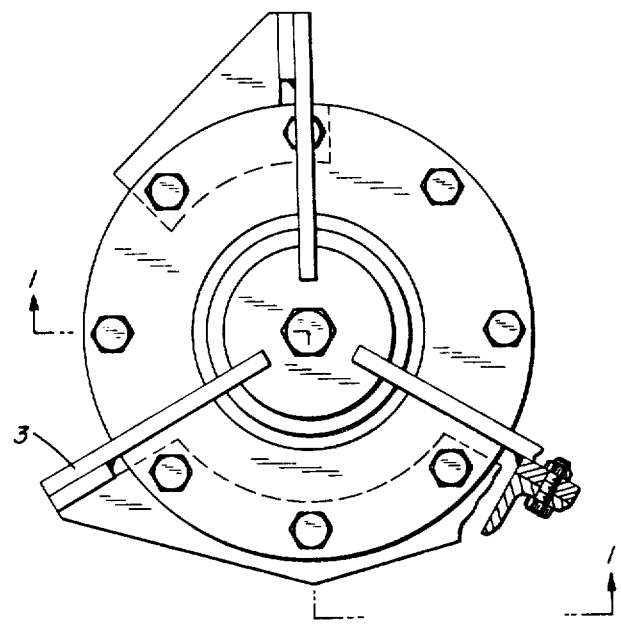

United States Patent [19]

Lassiter, Sr.

[11] 4,036,752

[45] July 19, 1977

[54] DEWATERING CLAY SLURRIES

[75] Inventor: Marvin Stevens Lassiter, Sr., Lakeland, Fla.

[73] Assignee: American Cyanamid Company, Stamford, Conn.

[21] Appl. No.: 628,031

[22] Filed: Nov. 3, 1975

Related U.S. Application Data

[63] Continuation-in-part of Ser. No. 543,763, Jan. 24, 1975, abandoned, which is a continuation-in-part of Ser. No. 410,840, Oct. 29, 1973, abandoned.

[51] Int. Cl.² .............................................. B01D 21/01
[52] U.S. Cl. ...................................... 210/46; 210/83; 71/64 SC
[58] Field of Search ....................... 210/42, 44, 46, 45, 210/47, 49, 52, 55, 83; 75/1, 2; 106/71, 72; 423/167; 71/64 C, 64 SC, 64 JC

[56] References Cited

U.S. PATENT DOCUMENTS

| 3,680,698 | 8/1972 | Liu et al. ............................... 210/46 |
| 3,761,239 | 9/1973 | Cook et al. .......................... 71/64 SC |

OTHER PUBLICATIONS

Haynsworth et al., "Building Land With Phosphate Wastes", Preprint 70-H-308, S.M.E. of A.I.M.E., Oct. 21-23, 1970.

Timberlake, R.C., "Building Land With Phosphate Wastes", Mining Engineering, Dec. 1969, pp. 38-40.

Primary Examiner—Thomas G. Wyse
Assistant Examiner—Benoit Castel
Attorney, Agent, or Firm—H. G. Jackson

[57] ABSTRACT

Sand slurries dispersed over the surface of ore processing operations waste product clay slurries and over-burden dropped onto the area give useful in-place land-fill.

6 Claims, 3 Drawing Figures

DEWATERING CLAY SLURRIES

CROSS REFERENCE TO RELATED APPLICATIONS

This application is a continuation-in-part of copending Ser. No. 543,763 filed Jan. 24, 1975 which is a continuation-in-part of Ser. No. 410,840 filed Oct. 29, 1973, both now abandoned.

BACKGROUND OF THE INVENTION

1. Field of the Invention:

The invention pertains to reclaiming surface mined lands by using waste products from mining operations.

2. Description of the Prior Art:

Since valuable ore deposits often occur in nature intimately mixed with a variety of less valuable or desirable constituents, it is a primary function of the ore processing industry to remove or separate as much of the extraneous constituents from the desired ore as possible. The flotation process developed in the early 1930's has proven to be a valuable tool for assisting in the removal of unwanted waste products from ores and is in wide use today in a variety of ore processing operations. However, since the development and utilization of the flotation process by the ore processing industry, disposal of the waste products resulting therefrom has presented a monumental problem. U.S. Pat. Nos. 3,761,239 (1973) and 3,763,041 (1973) teach processes for removing water from slimes and tailings to yield useful land-fill compositions. U.S. Pat. No. 3,680,698 (1972) suggests the addition of sand to flocculated waste product solids to obtain a high density solid. I have discovered that flocculation is not necessary when sand is added to waste products by spraying a sand slurry over the surface of the waste products.

SUMMARY OF THE INVENTION

The invention is a process for removing water from waste products of ore processing operations comprising depositing slurried slimes of about 3 to 5% solids into a mined out area until the area is full, removing water from the settled slimes until about one foot of water remains upon the slurried slimes, floating sprinkler heads on the water and spraying sand slurry over the surface of the waste product with a spray nozzle unit comprised of a nozzle mounted in a pipe tee for dispersing the sand slurry upward, a cone deflector with a configuration of a Tractrix curve mounted with brackets above the nozzle on a vertical arm which connects at its lower end to the pipe tee, and pressure means for propelling the sand slurry through the nozzle and against and away from the cone to cause a circular spray of the sand slurry.

THE DRAWINGS

Figure 1:
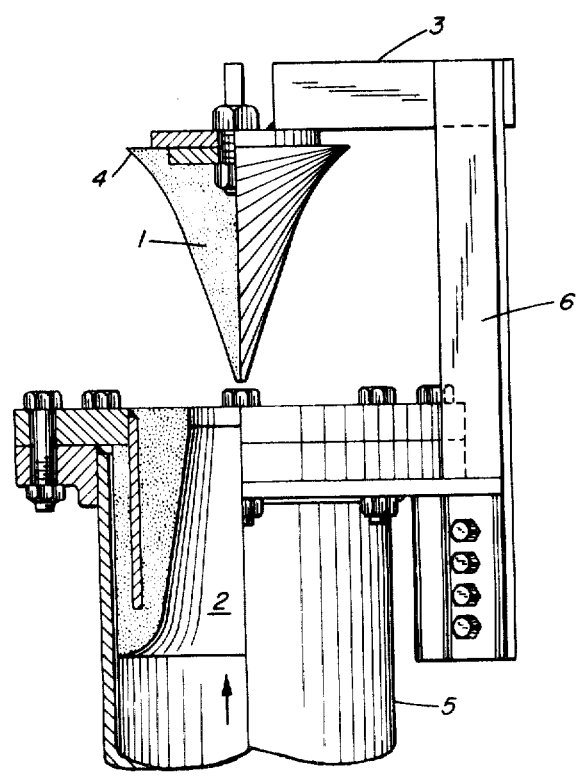
Figure 3:
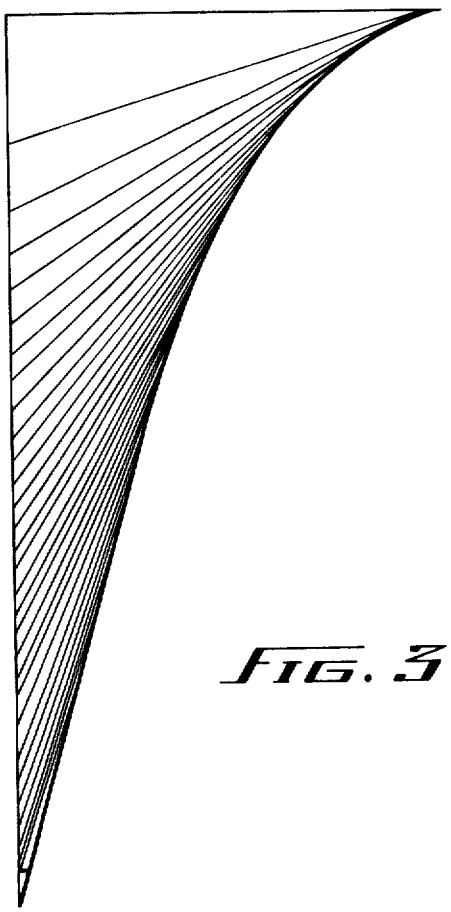

FIG. 1 illustrates deflector cone (1) and nozzle (2).
FIG. 2 is a plan view of the deflector cone.
FIG. 3 is a full size Tractrix cone pattern.

DESCRIPTION INCLUDING PREFERRED EMBODIMENTS

Solids suspended in water such as slimes, tailings, waste, pulps and the like are compacted to a useful state by spraying a sand slurry over the surface of the suspension in such a manner as to give high solids density. The sand slurry is sprayed from a spray nozzle unit, including a deflector cone 1 and spray nozzle 2 of FIG. 1 and bracket 3 of FIG. 1 designed to provide maximum uniform area coverage with minimum height of spray. The configuration of the deflector cone, FIG. 3 is that of a Tractrix or Schiele's anti-friction curve. The invention provides a spray cover of a large diameter circle at low hydraulic pressure with minimum spray height to avoid pattern disturbance by the wind.

A sand slurry is pumped with sufficient hydraulic pressure through nozzle 2 of FIG. 1 against the deflector cone 1 of FIG. 1 to give a circular slurry spray of about 90 ft. diameter in the air over the surface of ore processing operations waste products. Nozzle 2 is mounted in the vertical stem of a pipe line tee 5.

A typical nozzle 2 and cone 1 unit as shown in FIG. 1 is about 18 inches in height. The nozzle 2, about 6 inches in height and about 3 inches in diameter in the upper narrower opening expands downward to a bottom diameter of about 5 inches. The bottom of the deflector cone 1 is centered about 2 inches above the top of the nozzle 2. The bottom of the deflector cone is about $\frac{1}{4}$ inch in diameter and expands to about 6 inches in diameter where the sand slurry leaves the cone at 4 as a spray. The deflector cone is held in place by bolting to a bracket 3 which is mounted on a vertical arm 6 connected at its lower end to the pipe line tee 5.

Maintaining a hydraulic pressure of about 22 psig on the slurry causes a circular spray over the surface of the area having about a 90 foot diameter.

A sand slurry sprayed over a waste product area affords release of water normally trapped by colloidal clays. Thus, useful soil is formed, useful, for example, for reclamation of mining pits. In addition, my invention provides rapid recovery of water from the waste products for reuse.

Common practice in phosphate mining operations is to store wastes from the phosphate recovery plants in impoundment areas enclosed by large earth dams. The waste slurries thicken very slowly, so that years may elapse before the expense and hazard of earth dam maintenance can end. Other disadvantages are the initial high cost of large earth dams and the limited use that can be made of old abandoned settling areas.

A mined-out pit was utilized as a test site to illustrate the invention. The test site had a volume capacity of 377.3 acre feet and was equivalent to 21 acres of mine average pit which would produce 118,490 tons of waste clays and 234,016 tons of tailing sand.

Waste clay slurry was metered into the test pit by continuously recordinhg a weir overflow depth and by taking a continuous proportional sample. Liquid level was maintained at or below average natural ground elevation 122,439 Tons of waste clays were placed in the test pit over a 6 months period. The average concentration of clays in the slurry flowing to the pit was 3.54% solids.

Tailing sand was sprayed over the surface of the test area. Application of the tailings was by pumping the sand slurry through 7 nozzles 2 FIG. 1 mounted on top of the two pipelines. The pipelines were mounted on pontoons, so that they could be relocated by towing with a work boat. Spray lines were positioned to distribute sand slurry over approximately 37,000 square feet at each anchored location. Complete coverage of the waste clay slurry surface with tailings sprays is not essential, as there is a considerable drift of sand below the surface of the slimes. The first application of tailings was by two spray periods of 5$\frac{1}{4}$ hours each at the same pipeline location. Between these spray periods tailings were pumped to a locationn outside of the test area. Seventeen spray pipeline locations were required to cover the test pit area. After the first application, the pit contained 110,867 tons of waste clays and 149,317 tons of tailing sand. The tailings spray pipelines were repositioned to again cover the entire test area with tailings sand. These applications were for 6¼ hours at each location. A total of 236,465 tons of sands was applied to the test area during the entire experiment. The ratio of waste clays to waste sand may vary from 25/75 to 75/25 on dry weight basis.

After the spraying, the waste slurry was thickened and clear water was released which could have been recycled immediately. At completion of tailings and spraying, the slurry in the test pit contained 48.6% solids by weight. One and one-half weeks after the final addition of wastes to the test area, piles of earth left piled at the pit edge were pushed into the pit by bulldozers. It was evident that some displacement of slurry occurred, but that substantial quantities were enveloped or covered over by the bulldozed material. Three and one-half weeks later a causeway was pushed across both pits of the test area, a distance of approximately 650 feet. Test holes bored through the causeway fill showed that the top 8 to 12 feet of fill material displaced the sand slime mixture, the next lower 2 to 4 feet was mixed overburden fill and sand slime mixture and below this level was eight to 14 feet of waste sand slime material. The overburden may be dropped onto the slurry by a dragline or an excavator loader. The tails-slime mix, just prior to covering with overburden, has a jelly-like consistency in the top 4 to 6 feet. While this mass can be covered with overburden, which is bulldozed over the mixture, there is an improved method for covering the mixture. This method involves a dropping technique and the use of an excavator-loader or a dragline to drop the overburden onto the surface of the mixture from a height of 2 to 50 feet, preferably 10 to 20 feet. Dropping the overburden onto the jelly-like surface vibrates the mixture, improves the dewatering of the jelly-like mass, and produces a relatively uniform mixture of slimes, tails and overburden in the 4 to 6 foot layer.

I claim:

1. A process for removing water from slurried waste clay products of ore processing operations comprising
    depositing slurried slimes of about 3 to 5 % solids into a mined out area until the area is full,
    removing supernatant water settling the slimes, from the settled clay wastes until about one foot of water remains upon the slurried slimes,
    floating sprinkler heads on the water the sprinkler heads being attached to spray line means connected to a source of sand slurry.
    spraying sand slurry over the surface of the waste product with a spray nozzle unit comprised of a nozzle mounted in a pipe tee for dispersing the sand slurry upward, a cone deflector with a configuration of a Tractrix curve mounted with brackets above the nozzle on a vertical arm which connects at its lower end to the pipe tee, and pressure means for propelling the sand slurry through the nozzle and against and away from the cone to cause a circular spray of sand slurry wherein the ratio of waste sands sprayed over waste clays varies from 25/75 to 75/25 on dry weight basis and removing water from the sand sprayed slurry.

2. A process according to claim 1 wherein the sand slurry is tailing sands from phosphate mining.

3. A process according to claim 2 wherein the waste products are clay slurry from phosphate mining.

4. A process according to claim 3 with the additonal step of
    dropping overburden onto the compacted filled area to leave a strengthened land-fill.

5. A process according to claim 2 with the additional step of
    dropping overburden onto the compacted filled area to leave a strengthened land-fill.

6. A process according to claim 1 with the additional step of
    dropping overburden onto the compacted filled area to leave a strengthened land-fill.

* * * * *